United States Patent Office.

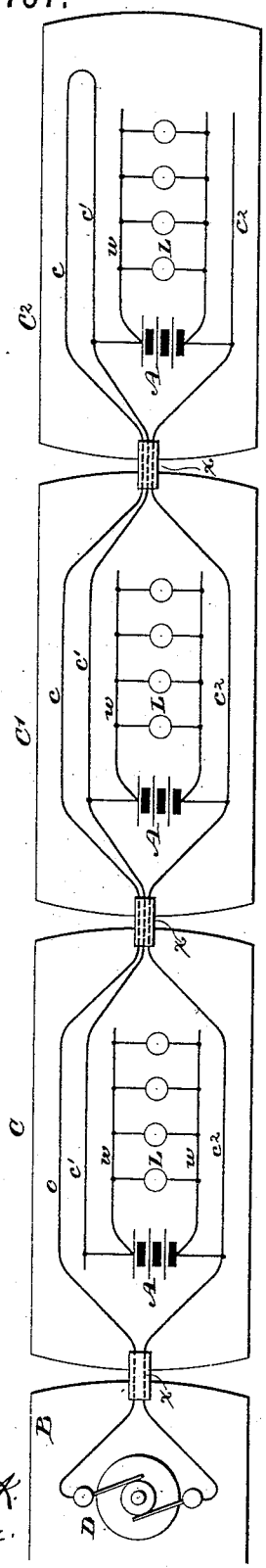
(No Model.)
W. W. GRISCOM.
TRAIN LIGHTING BY SECONDARY BATTERIES.
No. 393,757. Patented Dec. 4, 1888.
Witnesses.
Geo. W. Breck.
C. E. Ashley.
Inventor,
W. W. Griscom.
By his Attorney Wm. B. Vansiz

WILLIAM W. GRISCOM, OF HAVERFORD COLLEGE, PENNSYLVANIA.

TRAIN-LIGHTING BY SECONDARY BATTERIES.

SPECIFICATION forming part of Letters Patent No. 393,757, dated December 4, 1888.

Application filed August 10, 1888. Serial No. 282,394. (No model.)

*To all whom it may concern:*

Be it known that I, WILLIAM W. GRISCOM, a citizen of the United States, and a resident of Haverford College, in the county of Montgomery and State of Pennsylvania, have invented certain new and useful Improvements in Electric Train-Lighting, of which the following is a specification.

My invention is an improvement in the arrangement of electrical circuits for use in car or train lighting by secondary batteries and in the connectors for uniting the circuits of two or more cars in a train.

I provide for rendering each car of a train electrically independent by placing a storage-battery in each car, and I charge these storage-batteries from a dynamo located on one car—say the first—of the train. To equalize the potential at any point in the circuit I lead the charging-current to the batteries from opposite ends of the train. This necessitates the use of three main conductors, and where these conductors are joined between the cars of a train it sometimes occurs that a car, having been turned end for end, owing to a change in direction of movement or other cause, presents conductor-terminals which do not properly register or coincide with the conductor-terminals on the meeting end of the adjoining car; and one object of my invention is to overcome this difficulty thus presented.

I provide a connector for three conductors in which there are three contact-points or three conductor-terminals, one of which is fixed with respect to the other two. These latter are located upon opposite sides of said terminal and are movable around it—that is, by a rotary movement they may exchange positions—while the third or central contact remains unchanged. It is arranged as if the first conductor was at the center of a circle and the two movable contacts were on a single diameter. A movement of rotation changes the position of both movable contacts with respect to the central contact without changing the distance separating them.

The accompanying drawings illustrate my invention.

Figure 1 is a view of the arrangement of the train-circuit. Fig. 2 is a view of the connector employed. Fig. 3 is a cross-section of a connector.

In Fig. 1, B is a baggage-car carrying dynamo D. $C$ $C'$ $C^2$ are passenger-coaches. Each coach carries a secondary battery or accumulator, A, supplying a working-circuit, $w$, feeding lamps L. In order to charge each and every battery A from dynamo D, and to have the electro-motive force at the terminals of each battery in the charging-circuit equal, I connect one pole of the dynamo D with a conductor, $c^2$, connected to one terminal of each and every battery, beginning with the nearest one. The second terminal of the dynamo I connect with the second terminal of each and every battery by a conductor, $c$ $c'$, beginning with the most distant battery. This necessitates the use of three conductors, which are severable between cars, and in order that the connections may be rapidly and correctly made I have devised a special form of connection, $x$, having the features of improvement described. This is shown in Figs. 2 and 3.

I is a section of insulating material. The conductors $c$ $c^2$ are fixed into this section of insulating material I; but the third conductor, $c'$, is so arranged as to permit of rotating the insulating-section I upon it. Each conductor terminates in a contact-point, $p$, having a notched surface to prevent latitudinal movement when contact is made, and each contact $p$ is supported upon a helical spring, $s$, acting to preserve contact between meeting surfaces by spring-pressure. The two sections of the connector $x$ are duplicates, and when the contacts are brought together suitable means for holding or locking them in such position must be employed. I have illustrated this by the use of hooks $h$ and eyes $i$, operating in a manner well understood.

A train equipped as shown in Fig. 1, having three conductors extending its length, is at the end of a trip separated, and the individual cars are perhaps next coupled with other cars. When this is done, it will be very likely to happen that two cars will be brought together in such a manner that conductor $c$ of one car will be presented to conductor $c^2$ of the adjoining car, the result being that the battery A of such cars will be discharged instead of charged. By providing means for reversing the position of conductors $c$ and $c^2$ with respect to the third conductor, $c'$, this difficulty is overcome, and the system of arrangement is rendered universally applicable to trains having three electrical conductors, as described.

What I claim, and desire to secure by Letters Patent, is—

1. In a system of electric lighting for railway-trains, the combination of a generator of electricity located in one car, two or more cars, each containing a secondary battery, a working-circuit for each battery, a main conductor connecting one terminal of the dynamo with one terminal of each battery in succession, beginning with that located in the nearer car, and a main conductor connecting the second terminal of the dynamo with the second terminal of each battery in succession, beginning with the battery located in the more distant car.

2. A connector for a train-circuit, having three conductors consisting of three contact-points, one of which is fixed with respect to and is located between the other two, and means for rotating said two contacts around the fixed contact, substantially as described.

3. In a connector for a train-circuit, a conductor-terminal located in position at a central point, two other conductor-terminals located on the same diametral line, and means for changing the position of the two last-named terminals with respect to the first-named terminal by a rotary movement, substantially as described.

4. In a train-circuit having three conductors, the combination of a pair of circuit-connectors, each having three contact-points located in the same line or plane, substantially as described.

W. W. GRISCOM.

Witnesses:
DANIEL E. DELAVAN,
W. H. SHOURDS.